United States Patent [19]
Coren

[11] 4,191,987
[45] Mar. 4, 1980

[54] CLIP-ON PROTECTOR

[76] Inventor: Gerald Coren, 18 Willben La., Plainview, N.Y. 11803

[21] Appl. No.: 880,756

[22] Filed: Feb. 24, 1978

[51] Int. Cl.[2] .................................................. H02H 3/22

[52] U.S. Cl. ...................................... 361/124; 361/117; 361/120; 337/18

[58] Field of Search ............... 361/117, 124, 120, 119; 337/28, 31, 32, 34, 18

[56] References Cited

U.S. PATENT DOCUMENTS

| | | | |
|---|---|---|---|
| 3,254,181 | 1/1964 | Lemieux | 337/18 |
| 3,813,577 | 5/1974 | Kawiecke | 337/32 X |
| 4,009,421 | 2/1977 | Splitt et al. | 337/18 X |
| 4,132,915 | 1/1979 | Wilms | 361/120 X |
| 4,133,019 | 1/1979 | Roach et al. | 361/124 |
| 4,150,414 | 4/1979 | Pagliuca | 361/124 |

*Primary Examiner*—J. D. Miller
*Assistant Examiner*—L. Schroeder

[57] ABSTRACT

A clip-on protection device for use with an over-voltage protector to protect sensitive apparatus including telephones. The device comprises a housing in which is disposed in electrically insulated spaced array, electrical contact means and head conduction means. Each one of these means is formed with fingers that extend from the housing. Movable elements are disposed within the housing. These movable elements include fusible spacers. The housing clips onto the over-voltage protector with the fingers engaging the respective electrodes thereof. A sustained overload condition causes the fusible spacers to fuse whereupon the movable elements operate to short the electrical contact means to ground.

17 Claims, 4 Drawing Figures

CLIP-ON PROTECTOR

This invention relates to equipment and methods for protecting apparatus from over-voltage conditions and is particularly directed to over-voltage sensitive devices attached to electrical conductors serving various types of apparatus such as used for communication. An example of the protection device's application is the device protecting apparatus from the effects of excessive voltage such as might occur because of lightning, a fault, contact by a high tension line and the like.

Of the various types of equipment presently employed for accomplishing the foregoing, each suffers from one or more disadvantages including excessive cost and size, lack of adaptability to existing protector terminals, maintenance difficulties, hazardous conditions during servicing, loss of function in the presence of sustained overload, lack of safety provision thereby permitting the apparatus supposedly under protection to function without a protector, and less-than-optimum reliability.

It is an object of this invention to overcome or substantially reduce the foregoing shortcomings and to this end the invention provides improvements in performance, utilization and construction leading to reductions in size and cost, adaptability to existing mounting locations, reduction in hazards, an assurance that the over-voltage protector is installed, ability to utilize the device in a densely packaged area, simplification and safety in servicing and an increase in reliability. Moreover, in the invention techniques, additional protection features are attained without significantly impairing the essential simplicity of the construction.

The invention consists of the novel methods, processes, parts, steps, combinations and improvements herein shown and described.

Serving to illustrate exemplary embodiments of the invention are the drawings of which:

Figures 1, 2:
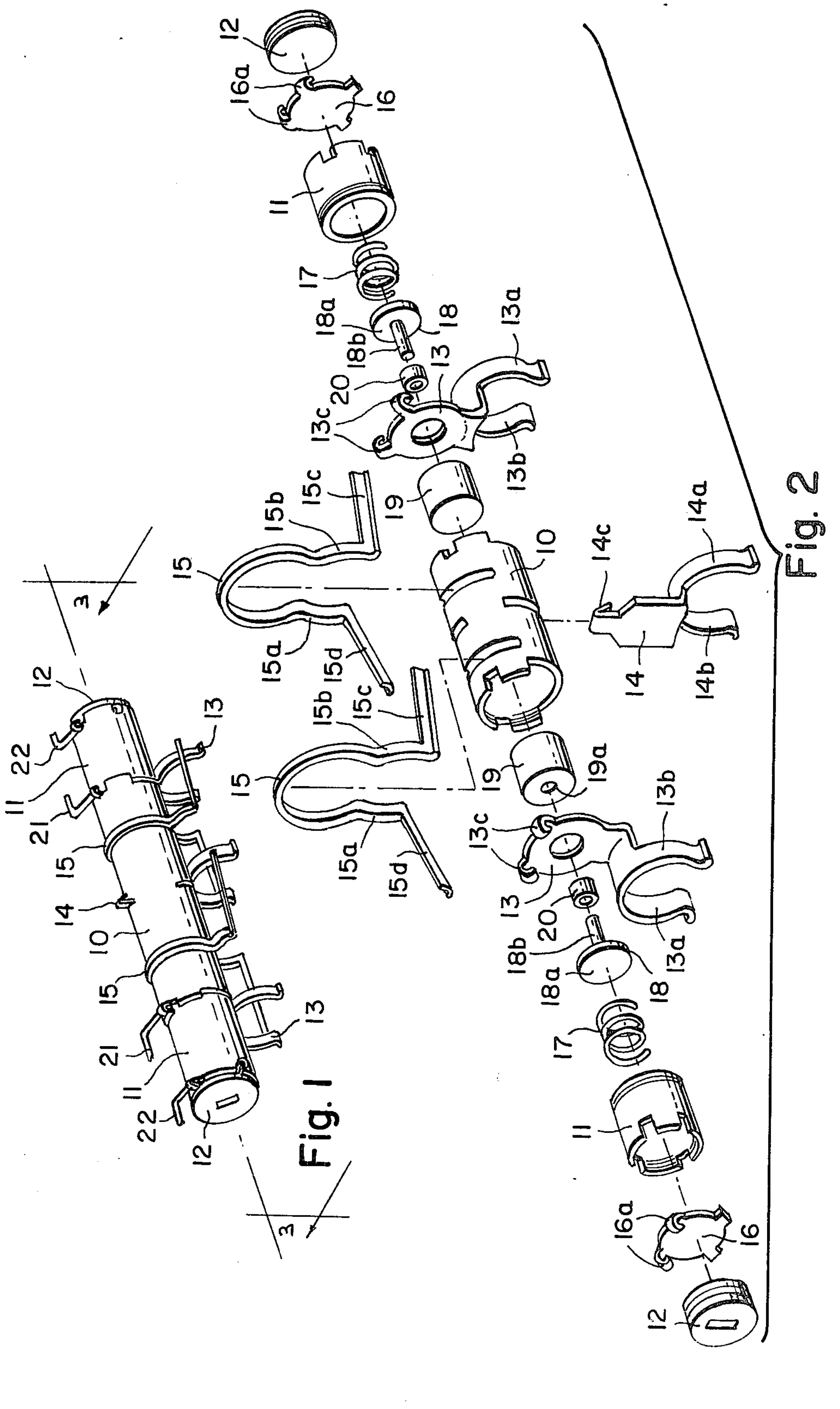
FIG. 1 is an isometric view illustrating the invention.
FIG. 2 is the detail view of components taken in FIG. 1.
Figure 3:
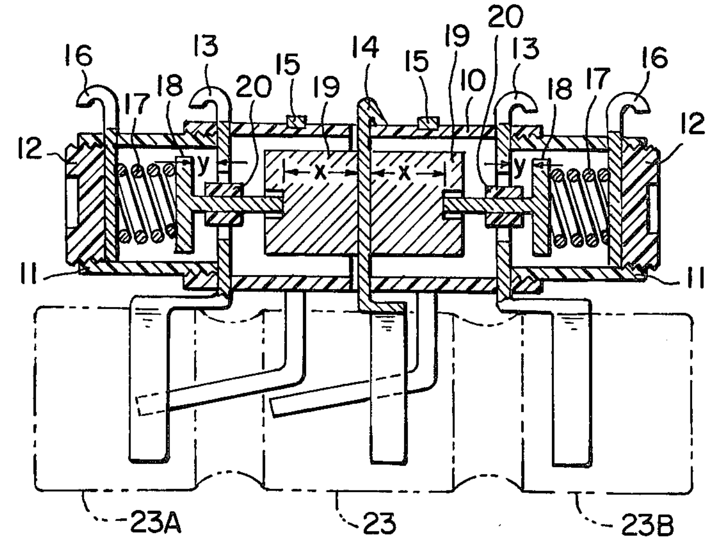
FIG. 3 is a sectional view taken along the line 3—3 of FIG. 1 and looking in the direction of the arrows to reveal the components of the device of FIG. 1.

Referring to the embodiment of FIGS. 1-3, the arrangement therein illustrated comprises a housing consisting of a center 10 with two identical ends 11, all shown as hollow cylinders, and two identical cylindrical end caps 12. Each of these is constructed of a nonconducting material illustratively shown to be Bakelite, although end caps 12 may be metal, and may be assembled by such means as glue or threaded internally and externally, as shown and hereinafter described, in order to allow ease in assembly and disassembly.

Mounted in and located on the housing in aligned relationship are two identical electrical transfer plates 13, one heat transfer plate 14, and two identical safety contactors 15. Each of these five parts may be made of any suitable material; phosphor bronze, beryllium copper or spring brass are satisfactory. The electrical transfer plates 13 are placed at the ends of housing center 10, positioned by such means as having the center shaped to accept these parts and secured tightly when housing ends 11 are screwed into the center. Heat transfer plate 14 is mounted through slots in the housing center and held in place by suitable means such as a spring clip **14*c* shown to be formed from a protrusion of the heat transfer plate. Each safety contactor 15 is held in position by a groove on the outside of center 10 and by extension arms 15*c*, 15*d*** which rest against the heat transfer plate and an adjacent electrical transfer plate at their spaced blades, described hereinafter.

Electrical transfer plate 13 and heat transfer plate 14 each has a pair of spaced blades **13*a*, 13*b* and 14*a*, 14*b* respectively. Each pair of associated blades comprise a holding clip. The holding clips are aligned to receive and hold the over-voltage protector 23. In the embodiment illustrated in FIGS. 3-4 this over-voltage protector is of known construction; examples of which are an AEI type 16 gas tube protector, a TII-16 type surge arrester, a Siemens type TI-6350 surge voltage arrester. A cartridge of this type comprises a gas filled housing having a pair of opposed, spaced electrodes each of which makes electrical contact with one of the cartridge end terminals 23A and 23B**. In the presence of an excessive voltage the gas between the electrodes is ionized thereby effectively shorting the end terminals and connecting them to the case of the protector and to external ground as described below. The lines and apparatus connected to these electrodes via the electrical transfer plates are thus short-circuited to thereby prevent the over-voltage condition from causing excessive current flow in the protected apparatus.

The two end plates 16 are identical and are made of any suitable material; copper or brass is satisfactory. These plates are held in place at the distal ends of housing ends 11 by such means as having the housing ends shaped to accept these parts and secured tightly when end caps 12 are screwed into housing ends. The end caps have slots in their ends to accommodate a screw driver if necessary for tightening.

In the application of this device each of the end plates 16 is connected to external ground. This is illustratively accomplished by such means as a crimp type wire connector **16*a* shown to be formed from a protrusion of the end plate, which allows one end of wire 22** to be electrically and mechanically connected to the end plate with soldering assistance while the other end of the wire is connected to external ground by suitable means.

Within housing center 10 and ends 11 are two identical springs 17, two identical plungers 18, each with a large diameter head **18*a* and shaft 18*b*, and two identical fusible spacers 19 described hereinafter. Mounted symmetrically within each half of the housing (see FIG. 3), in spaced relationship, is one spring, one plunger and one fusible spacer. The springs are made of any suitable material, phosphor bronze, spring brass, beryllium copper or spring steel are suitable. The plungers may be made of any suitable material; copper, brass or steel is satisfactory. The fusible spacer may be lead, solder, babbit or other appropriate material in accordance with ratings and installation requirements of the protector 23, the fusible spacer being designed to melt when the current rating of the overvoltage protector is exceeded. Each spring acts between an end plate and plunger head in such a way that it tends to urge its associated plunger shaft against a fusible spacer. Movement of the fusible spacer and plunger shaft is resisted by the heat transfer plate 14**.

Around a portion of each plunger shaft is electrical insulation, illustratively shown as electrical insulation sleeving 20, which assures that plunger shaft **18*b* will not come into electrical contact with electrical transfer plate 13 as it passes through an annular opening in that plate. The fusible spacer 19 is cylindrical with a small guide hole 19***a* in the center of one face which is used to locate and guide plunger shaft 18*b*. In the assembled position the distance 'x' between the end of the plunger shaft 18*b* and the heat transfer plate 14 is larger than the distance 'y' existing between the underside of the plunger head 18*a* and the electrical transfer plate 13, illustratively shown to be three times larger in FIG. 3.

Each line terminal is connected to the device through a different wire 21 which mechanically and electrically connects to one of the electrical transfer plates 13 by means illustratively shown as crimp type connector 13*c*, formed form a protrusion of the electrical transfer plate.

Figure 4:
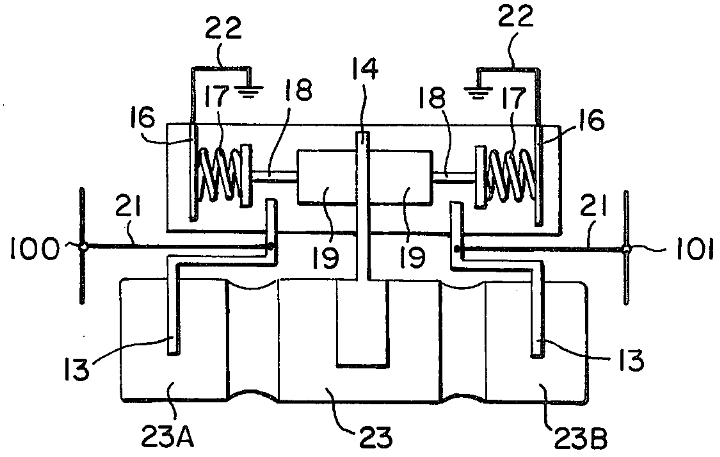
FIG. 4 is a diagrammatic illustration of the inventive device in combination with an over-voltage protector.

In FIG. 4 there is illustrated the combination of an overvoltage protector with the device. If an excessive voltage pulse exists at the line terminals 100 or 101 the current developed will be conducted to ground through the path consisting of its associated wire 21 to its associated electrical transfer plate 13, to its associated protector end terminal, then through the protector 23 which will ionize, to the protector case, through the heat transfer plate 14 and then through two parallel paths, thus using redundancy to provide an extra measure of reliability, each path to ground consisting of a fusible spacer 19, plunger 18, spring 17, end plate 16 and wire 22.

In the case of a prolonged over-voltage condition there is a possibility that the gas tube or other protective element will fail. If the element becomes an open circuit the apparatus and lines connected thereto are no longer protected. To eliminate this possibility the embodiment of FIG. 3 includes a shorting arrangement which provides an extra measure of safety and reliability as described hereinafter.

In event of a sustained excessive voltage the heat generated in the protector will be conducted by spaced blades 14*a*, 14*b* of the heat transfer plate 14 to the two fusible spacers 19. As excessive heat melts a fusible spacer, its plunger 18 is forced to move because of its spring 17. During this movement electrical contact is maintained between plunger shaft 18*b* and the fusible spacer. Eventually, when movement is large enough, and before the end of plunger shaft 18*b* touches heat transfer plate 14, the underside of plunger head 18*a* contacts electrical transfer plate 13, thus connecting line terminal 100 or 101 to ground through the path of its associated wire 21, electrical transfer plate 13, plunger head 18*a*, spring 17, end plate 16 and wire 22. In the illustrated use of this device there are two fusible spacers, each providing similar heat sensitive means and similar grounding means for said excessive voltage.

An important aspect of this device is its adaptability to existing terminals of presently utilized protectors, which may be removed from operation due to one or more undesirable deficiences and may be replaced by this device without major installation costs. This device may be operated across existing circuit terminals which presently utilize an air gap type protector such as made by Cook Electric Company, Western Electric Company or Reliance Electric, with the air gap protector removed, since safety during prolonged overload is provided by its own fusible element and is not dependent upon the fusible element backup accompanying the air gap protector. This small mobile holder for the gas-filled over-voltage protector may be encapsulated with a protector using a potting material, Stycast 2651-40 or RTV-21 are suitable examples, with wires for its connection left exposed, and may be maneuvered and positioned into place so that it is quickly and easily connected to existing circuit terminals. Another important feature of this small device is its adaptability to existing home office equipment presently utilizing densely packaged gas-filled over-voltage protectors which operate without the use of any fusible safety elements, such as in the TII 700 block. Only a minor modification, consisting of removal of the existing block ground connection at each protector case, is necessary.

An important feature providing additional safety in the use of the device is the optical use of two safety contactors 15 to prevent any electrical impulses from entering the apparatus unless an over-voltage protector is employed. When the protector is removed from the device the spaced blades 15*a*, 15*b* on each safety contactor, which are aligned to separate by the entrance of the over-voltage protector 23, will contract allowing extension arms 15*c*, 15*d* to connect the grounded plate 14 to an adjacent live electrical transfer plate 13 thereby shorting all plates to ground as described above along with line terminals 100, 101 connected to the electrical transfer plates. Thus shorted to ground the protected apparatus cannot function and no electrical impulses will enter the apparatus until the short is removed by placing a protector completely into the device. This arrangement is particularly important when it is recalled that some presently used over-voltage protector devices allow the circuit which is supposed to be protected to function although the protector is not installed in the device. This line grounding arrangement also provides an additional important feature of safety and ease of maintenance in the replacement of the over-voltage protector since the protector may be placed into the device's holding clips without fear of shock from a 'hot' line. Also, it is this feature which provides safety when replacement of the device is required such as when excessive voltage has caused melting of a fusible spacer. After the protector has been removed from the device by grasping the case on the protector and the heat transfer plate on the device, both of which are grounded at all times, the safety contactors ground all line terminals and the device may be disconnected without danger.

The safety contactor 15 performs the function of shorting the electrical transfer plate and heat transfer plate because of its physical configuration. The ends of the spaced blades 15*a*, 15*b* on the safety contactor are formed with a smaller distance between them than between the ends of the spaced blades 13*a*, 13*b* and 14*a*, 14*b* on the electrical transfer plate and heat transfer plate respectively. Also the lengths of the spaced blades on the safety contactor are shorter than the lengths of the spaced blades on the electrical transfer plate and the heat transfer plate. When the over-voltage protector is installed, the safety contactor's spaced blades 15*a*, 15*b* being short, touch the over-voltage protector on opposite ends of the protector diameter, and therefore the blades' ends are moved further apart than are the ends of the longer spaced blades 13*a*, 13*b* and 14*a*, 14*b* on the electrical transfer plate and heat transfer plate respectively, which touch the over-voltage protector below the protector's diameter. For these reasons the ends of the spaced blades on the safety contactor move a greater total distance from their contracted positions to their expanded positions than do the spaced blades on the electrical transfer plate or on the heat transfer plate. Because of this greater total outward movement of the spaced blades on the safety contactor, the extension arms 15*c,* 15*d* make contact with the electrical transfer plate's blades and the heat transfer plate's blades when the over-voltage protector is not in place and break contact with the blades on these plates during normal operation.

It is possible that the device may be removed from the existing terminals and not be replaced. To assure replacement of the device existing wiring should have been previously modified by removing from each of the two existing line terminal posts only the wire going to the apparatus and connecting this wire directly to a different electrical transfer plate 13. Connection of the apparatus wire may be accomplished by such means as direct connection to the unused crimp type wire connector 13*c,* or via such means as an electrical wire nut, to the end of a wire previously connected to the crimp type wire connector 13*c.* Through this rewiring additional safety is obtained since the device becomes a series element rather than a parallel element in the use of apparatus and it becomes impossible for the apparatus to function without the device and the protector in their proper places.

While only one embodiment of the present invention has been shown and described, it is to be understood that many changes and modifications can be made hereto without departing from the spirit and scope hereof.

What is claimed is:

1. Supplementary protection means for preventing the burn out of an over-voltage protector and the apparatus protected by same and wherein the over-voltage protector has a casing and spaced electrodes, comprising plungers with shafts substantially parallel to the axis of the protector to conserve space, each of said plungers connected to ground and oriented to potentially ground a different spaced electrode of said protector, resilient means urging said plungers towards a condition of electrical contact with said electrodes, heat conduction means for conducting heat from said protector case to fusible means during sustained overload, said fusible means comprising a fusible element in pressure engagement with said plunger, said fusible means located at a place remote from the protector but oriented to maintain said plungers and said electrodes in insulating relationship except during a condition of sustained overload threatening to burn out said protector which condition causes said fusible means to fuse whereupon said grounded plungers are urged into electrical contact with said electrodes, and grounding means for grounding said plungers whereupon fusing of said fusible means causes said electrodes to be grounded.

2. Protection means as defined in claim 1 including spring means resiliently urging said plunger towards electrical contact with said electrodes of said over-voltage protector.

3. Protection means as defined in claim 1 in which heat conducting means comprise a plate having a holding clip for releasably holding said protector while conducting heat threatening to burn out said protector during sustained overload to said fusible means which fuse allowing said grounded plungers to make electrical contact with said protector electrodes grounding same and the voltage overload.

4. Protection equipment for protecting a two wire circuit from sustained and transient over-voltage conditions comprising a housing in which is mounted two end plates, one heat transfer plate and two electrical transfer plates, said heat transfer plate and said electrical transfer plates each having a portion external to said housing shaped to form a pair of spaced holding clips for receiving and releasably holding a generally longitudinally shaped over-voltage protector having electrodes and a casing, said electrical transfer plates providing a connection from said circuit to said electrodes and said heat transfer plate providing two identical electrical paths from said casing through plungers, springs and end plates to ground, said plungers being resiliently urged towards contact with said electrical transfer plates, fusible means responsive to heating of said protector and located to insulate said plungers from said electrical transfer plates except when said protector is subjected to overload.

5. Protection means as described in claim 4 in which an additional wire from each of the two electrical transfer plates of said housing connects to a different apparatus wire which has been removed from its existing air gap protector terminal, thus placing the device in series with the apparatus and power line thereby providing assurance that the device and protector are installed.

6. Protection means as described in claim 4 for application with existing densely packaged home protection office equipment operating without fusible backup means in which the existing equipment ground connection at the case of each three terminal protector is removed so that the protector is grounded through fusible means in the device when the device is clipped onto the existing protector.

7. A clip-on protection device for use with an over-voltage protector comprising a housing, electrical contact means disposed in insulated spaced array in said housing, heat conduction means disposed in said housing and electrically insulated and spaced from said contact means, each of said contact means and conduction means including means extending from said housing and adapted detachably to engage the respective electrodes of the protector such that said conduction means is in thermal communication with the common or grounded electrode of the protector and each of said contact means is in respective electrical communication with a line-electrode of the protector, and movable means disposed in said housing and adapted electrically to ground a respective one of said contact means, said movable means including fusible means in thermal contact with said conduction means such that said movable means is normally electrically insulated from said contact means until a sustained overload condition causes said fusible means to fuse whereupon said movable means engages said contact means electrically to short same to ground.

8. The device of claim 7, each of said means extending from said housing being substantially complementary to the external periphery of the protector thereby allowing the device detachably to engage the protector.

9. The device of claim 8, each of said means extending from said housing being in the form of a pair of spaced blades having an arcuate or bowed portion allowing same to clip-on to a respective electrode of the protector.

10. The device of claim 7, said housing having a longitudinal length that is less than the longitudinal length of the protector onto which it clips.

11. The device of claim 7, safety contactor means adapted to short said contact means to ground when the device is disengaged or detached from the protector.

12. The device of claim 11, said safety contactor means adapted detachably to engage to the external periphery of said housing, the last-mentioned means resiliently biased to engage said contact means when the protector is removed from the device and disengage said contact means when the protector is inserted into the device.

13. The device of claim 7, said contact means including two electrical transfer plates disposed in said housing, said movable means including two plungers, biasing means urging each of said plungers into a pressured engagement with said fusible means, each of said plungers adapted to contact a respective one of said transfer plates, the dimensions of said fusible means being such as normally to space each of said plungers from contact with a respective one of said transfer plates until a sustained overload fuses said fusible means whereupon said biasing means drives an associated one of said plungers into contact with a respective one of said transfer plates shorting same to ground.

14. The device of claim 13, two end plate means disposed in said housing, each of said end plate means being in electrical communication with a respective one of said plungers and being formed with means for connecting same to a circuit ground lead, each of said transfer plates being formed with means for connecting same to a respective circuit line.

15. The device of claim 13, each of said transfer plates including an opening, each one of said plungers being configured so that a portion thereof is disposed through a respective one of said openings, said plunger portion being maintained from electrical contact with a respective one of said openings such that said plungers are driven into electrical contact with a respective one of said transfer plates only upon the fusing of said fusible means.

16. A clip-on protection device for use with an over-voltage protector comprising a housing, electrical contacts disposed in insulated spaced array in said housing, heat conduction means disposed in said housing and electrically insulated and spaced from said contacts, each of said contacts and conduction means including means extending from said housing and adapted detachably to engage the respective electrodes of the protector such that said conduction means is in thermal communication with the common or grounded electrode of the protector and each of said contacts is in respective electrical communication with a line-electrode of the protector, said housing having a longitudinal length that is less than the longitudinal length of the protector, and means movable in said housing adapted electrically to ground a respective one of said contacts, said movable means including fusible means in thermal communication with said conduction means such that said movable means is normally electrically insulated from said contacts until a sustained overload condition causes said fusible means to fuse whereupon said movable means engages said contacts electrically to short same to ground.

17. The device of claim 16, that part of said heat conduction means which is disposed in said housing being in the form of a plate, said fusible means being disposed in opposed back-to-back pressure engagement against a respective face of said plate thereby causing said fusible means to share a common heat source.

* * * * *

UNITED STATES PATENT AND TRADEMARK OFFICE
CERTIFICATE OF CORRECTION

PATENT NO. : 4,191,987

DATED : March 4, 1980

INVENTOR(S) : Gerald Coren

It is certified that error appears in the above—identified patent and that said Letters Patent is hereby corrected as shown below:

In the abstract, on the 5th line, the word head should be --heat--.

Signed and Sealed this

*Tenth* Day of *June 1980*

[SEAL]

*Attest:*

SIDNEY A. DIAMOND

*Attesting Officer* *Commissioner of Patents and Trademarks*